Figure 1:
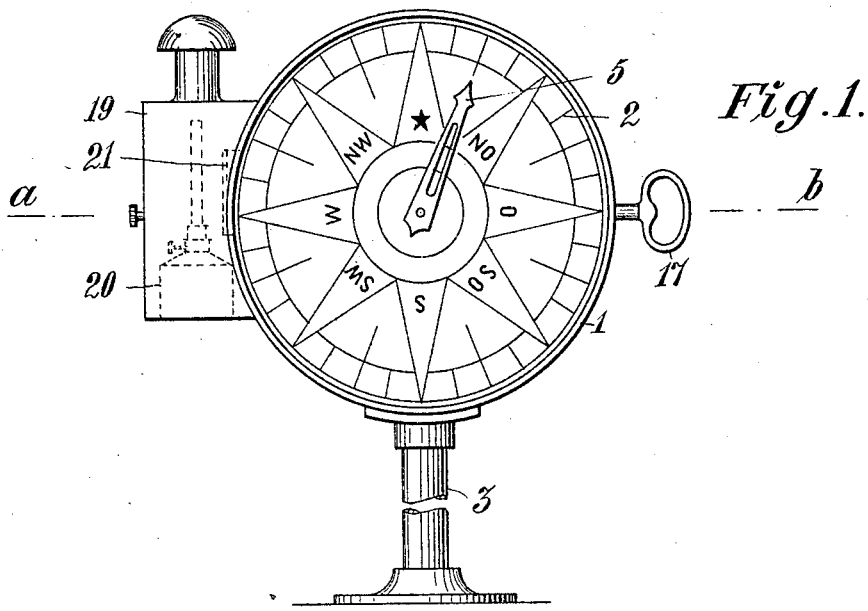

UNITED STATES PATENT OFFICE.

ARON LEONARD SÖDERSTRÖM, OF SUNDSVALL, SWEDEN.

COURSE-POINTER.

944,055.

Specification of Letters Patent.

Patented Dec. 21, 1909.

Application filed December 1, 1908. Serial No. 465,498.

*To all whom it may concern:*

Be it known that I, ARON LEONARD SÖDERSTRÖM, a subject of the King of Sweden, residing at Sundsvall, in the Kingdom of Sweden, have invented a new and useful Improvement in Course-Pointers, of which the following is a specification, reference being had to the drawing accompanying and forming a part hereof.

This invention relates to apparatus for indicating the course to be steered at sea, so-called course-pointers.

More particularly the invention relates to course-pointers of the kind consisting of a disk or dial suitably graduated like a common compass card, and a pointer journaled in the center of the dial so as to allow of being turned in relation to the dial.

The object of the invention is to enable the officer in command to lock the pointer of the apparatus in position, after adjustment, so that no other person on the vessel is able to move the said pointer.

The invention consists, chiefly, in the combination, with the pointer, of a locking device for the said pointer adapted to engage the axle thereof, and a removable key for operating the said locking device from without the apparatus. The locking device may consist of a clamp adapted to engage the edge of a disk at the axle of the pointer, said clamp being suitably carried at the end of a threaded spindle movable in a nut by means of the removable key.

The invention further comprises the construction and combination of parts hereinafter more particularly described.

In the drawing, I have shown, by way of example, a course-pointer embodying the invention.

Figure 2:
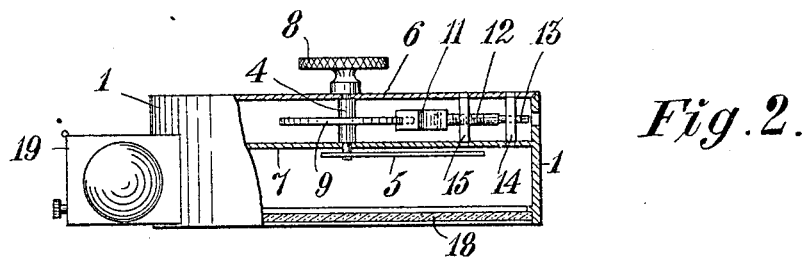
Figure 3:
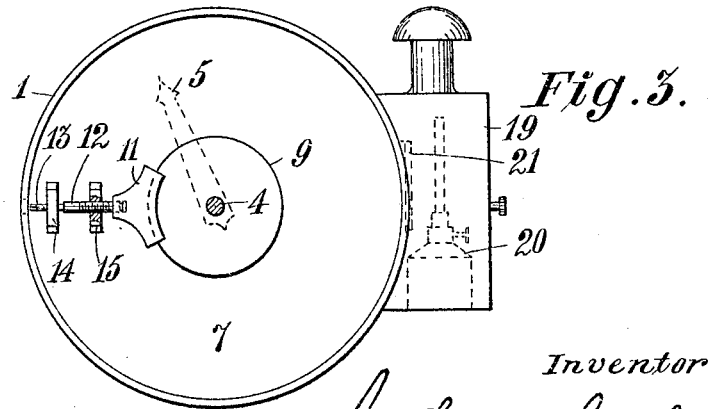

Figure 1 is a front view of the said course-pointer. Fig. 2 is a cross-section on line *a—b* of Fig. 1. Fig. 3 is a rear view of the apparatus, the rear bottom of the box being removed to show the locking device.

Referring to the drawing, 1 is a box inclosing a dial 2 which may be graduated like a common compass card. The box 1 is carried by a suitable frame or standard 3. Attached to a pivot pin 4 journaled in the parts 6 and 7 of the box is a pointer 5 adjustable to different positions, said pointer being provided with a suitably milled head 8 for turning the same. In order to enable the pointer to be locked in position, the pin 4 has a disk 9 attached to or made integral with the pin, said disk being adapted to be engaged by a friction clamp 11 having a groove fitting the edge of the disk. Connected to the clamp 11 is a spindle 13 having a threaded part 12, said spindle being adapted to turn about its axis in the said clamp. The spindle 13 is journaled in two parts 14 and 15 attached to the parts 6 and 7, one or both of the said parts having female threads corresponding to the threads of the spindle. The latter may be turned by a suitable key 17. Placed in front of the dial is a protecting glass 18. Placed at the side of the box 1 is a cap 19 inclosing a lamp 20 adapted to light the dial through a hole 21 in the wall of the box for night use of the apparatus.

When the apparatus is to be used, the pointer is adjusted to indicate the course to be steered, whereupon it is locked in position by the officer in command pressing the clamp 11 by means of the key 17 against the edge of the disk 9. The key is in the possession of the officer on duty, and no one else is able to move the pointer. The commanding officer thus has a reliable witness of the determined course.

I claim:

1. In a course-pointer, the combination of a dial, a pointer journaled in the center of the said dial, a spindle or axle upon which said dial and pointer are mounted, a locking device for the pointer adapted to engage the said axle, and a removable key for operating the said locking device from without the apparatus, substantially as and for the purpose set forth.

2. In a course-pointer, the combination of a dial, a pointer journaled in the center of the said dial, a spindle or axle upon which said dial and pointer are mounted, a disk on the said axle, a clamp adapted to engage the edge of the said disk, and a removable key for operating the said clamp from without the apparatus, substantially as and for the purpose set forth.

3. In a course-pointer, the combination of a dial, a pointer journaled in the center of the said dial, a spindle or axle upon which said dial and pointer are mounted, a disk on the said axle, a nut situated at the side of the said disk, a spindle having threads engaging the threads of the said nut, a clamp carried by the said spindle and adapted to engage the edge of the said disk, and a removable key for turning the said spindle from without the apparatus, substantially as and for the purpose set forth.

ARON LEONARD SÖDERSTRÖM.

Witnesses:
    ERNST H. AMNÉUS,
    GUST. WESTIN.